July 7, 1953  C. H. BROWN  2,644,252
LEVEE BUILDING MACHINE
Filed Aug. 29, 1947  5 Sheets-Sheet 3
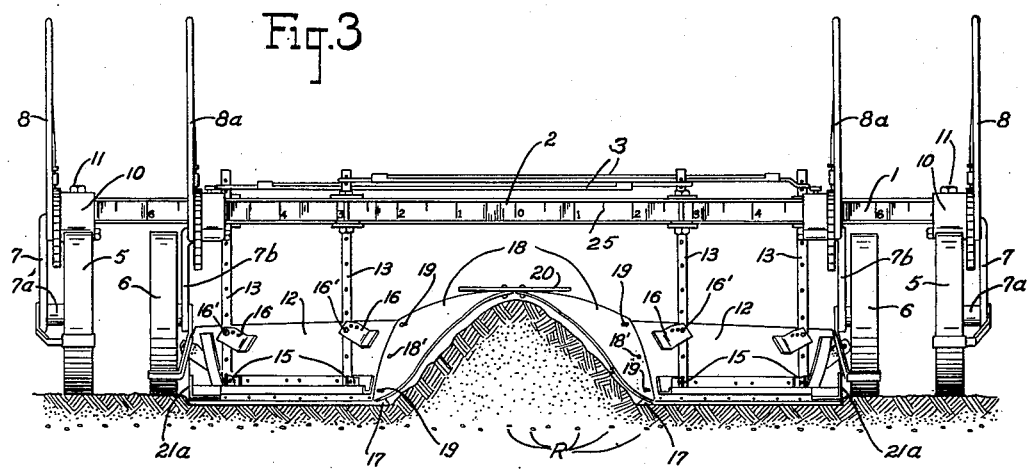
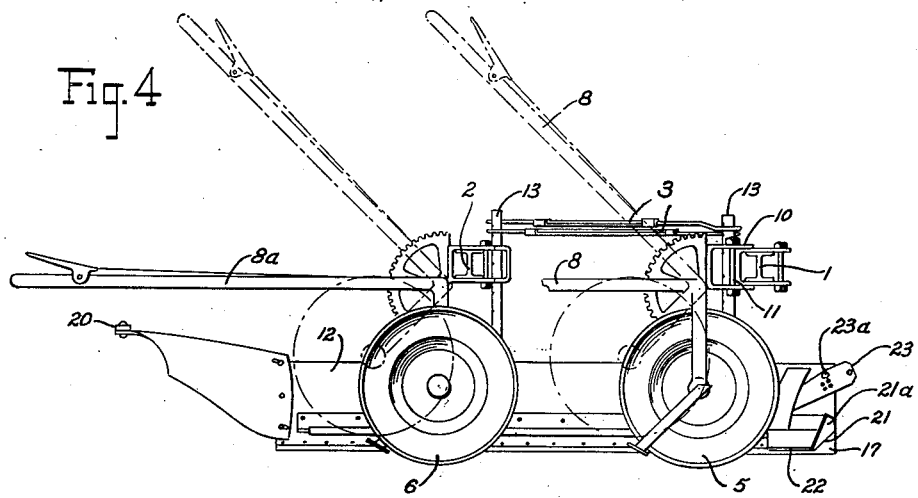
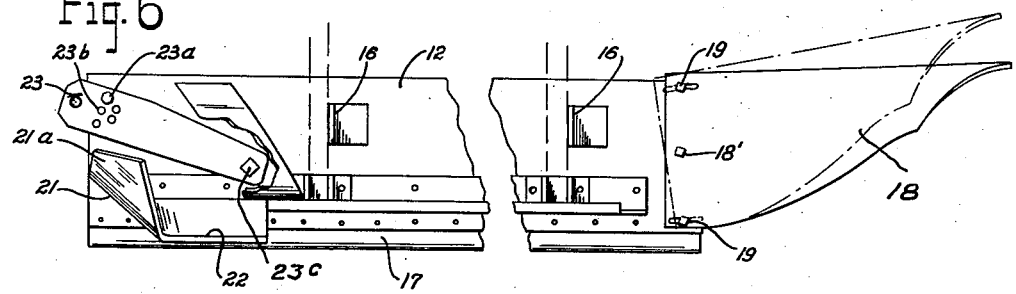
INVENTOR.
Charles H. Brown
BY
Wayland D. Keith
HIS AGENT

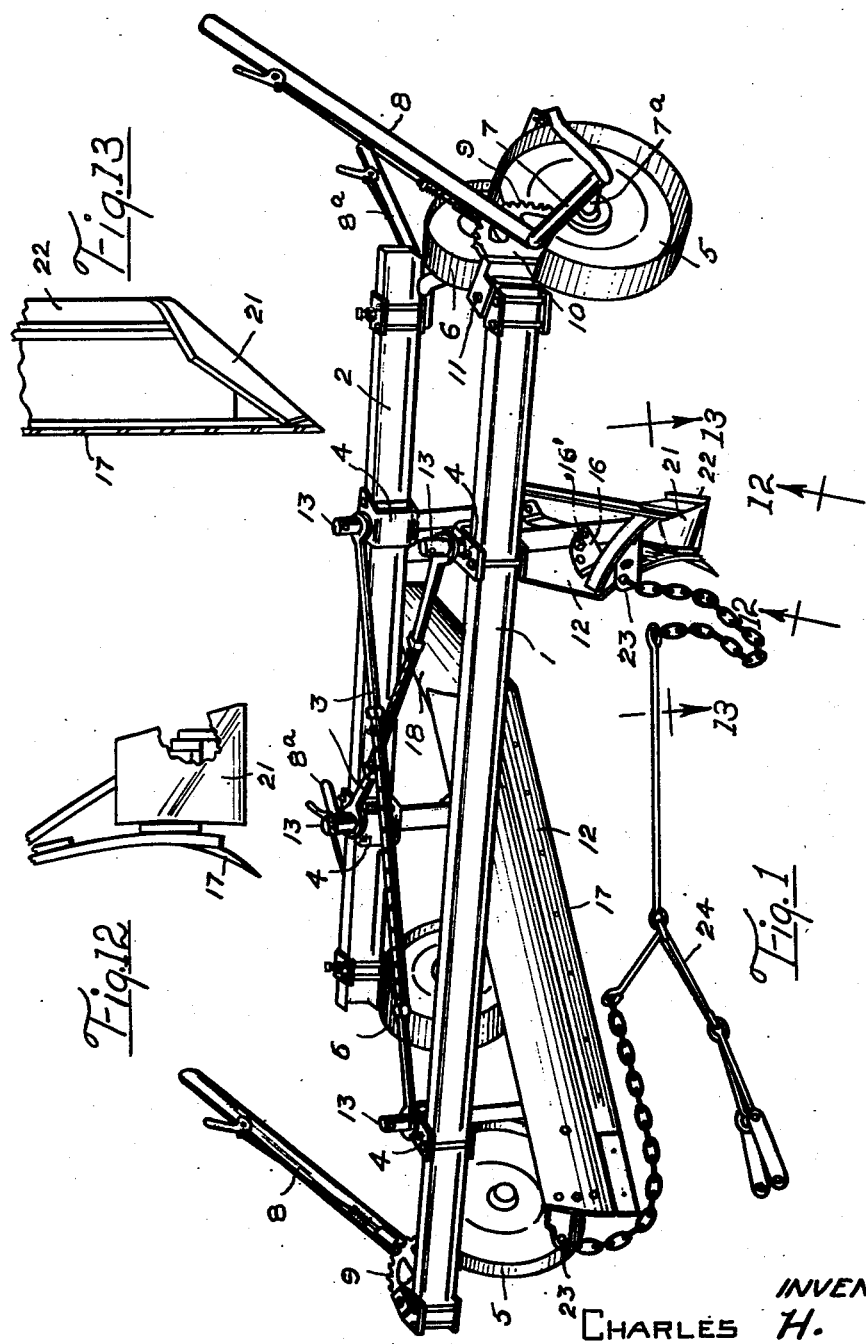

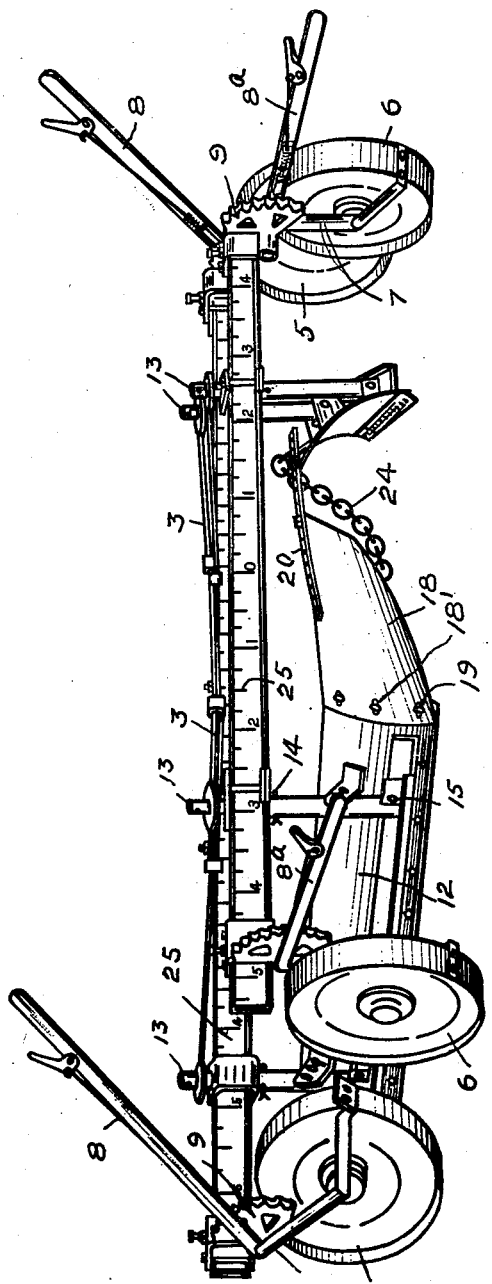

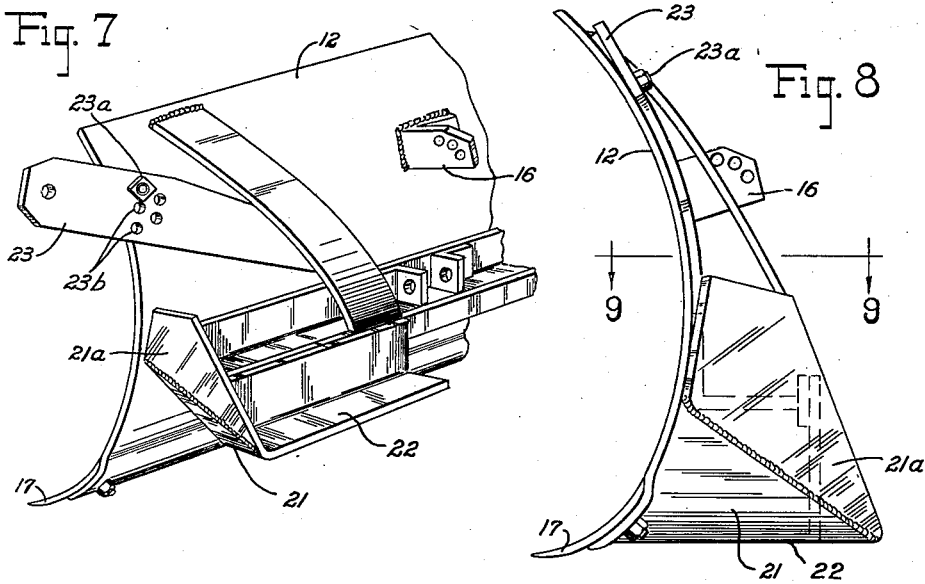
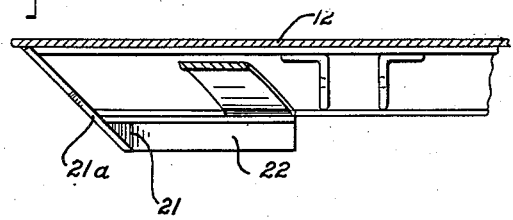
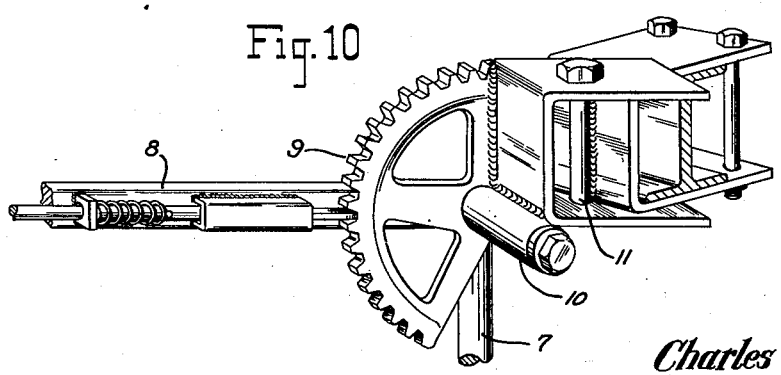

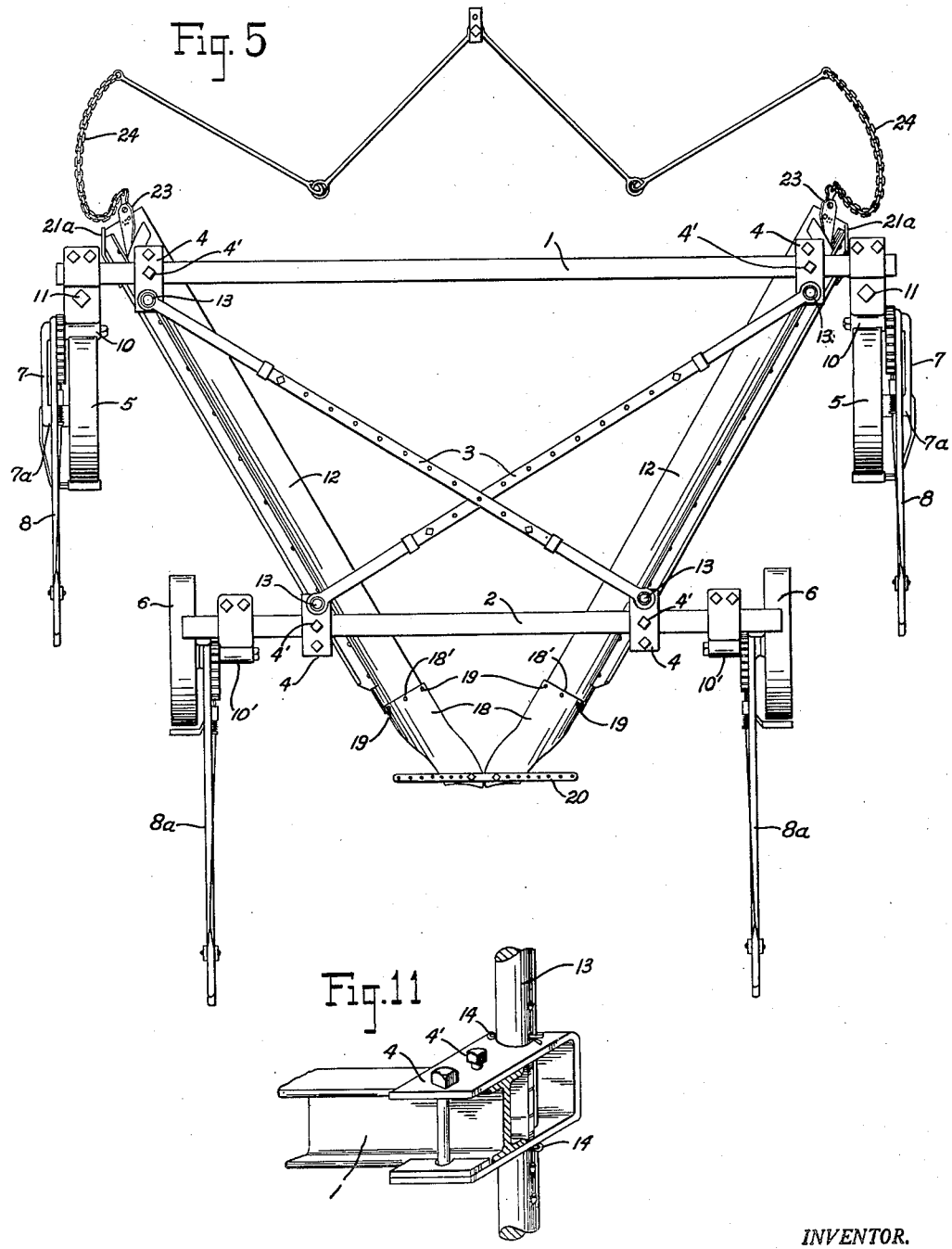

Patented July 7, 1953

2,644,252

UNITED STATES PATENT OFFICE 2,644,252

LEVEE BUILDING MACHINE

Charles H. Brown, Breckenridge, Tex.

Application August 29, 1947, Serial No. 771,202

8 Claims. (Cl. 37—154)

This invention relates to improvements in levee building machines, especially for building rice levees. In growing rice on well leveled land, the general practice is to plow the old levees down and break the land in the usual manner after which a leveling machine is passed over the land to bring it back to practically a true plane. The rice then is drilled into the soil rather deeply, preferably about four inches, and then the land is laid off by plowing guide furrows on contour lines and the levees are constructed by removing soil from over the seed bed, with as little digging up of the freshly sown rice as possible in order that the rice may come up with an even stand and all grow to maturity at the same time. This is very important now that the crops are harvested with a combine which thrashes the rice as it is cut and all of the rice needs to be well ripened.

It will be seen that the building of the levees quickly after the rice has been sown is very important as this work is done in the spring of the year when heavy rains are common. Heretofore should a heavy rain come, the rise would often start coming up before the levees could be built, which resulted in the destruction of so much of the rice that it has been necessary to sow an earlier maturing variety of rice alongside the levees, endeavoring thereby to have the re-sown areas mature at the same time that the earlier part of the sown crop matures.

Again most of the levees heretofore have been put up by what are termed "pusher" type drags working on one side of the levee at a time with which it was impossible to make levees of an even height, which often led to a break-over of the water when the field was flooded. These break-overs sometimes were rather disastrous in that the accummulated head of the water from an upper levee would cause the next levee to break and that a third and so on. These pusher type drags were constructed by mounting heavy boards on edge, and face the fronts of them with pieces of steel plate, with which it was impossible to work the land when it was in a sticky condition.

An object of this invention is to improve the construction of machines for building and maintaining levees wherein one or both sides of the levee may be built and extra dirt added at one operation, and wherein the machine may be moved crosswise over the levee without change of adjustment and without serious damage to the levee, with provision to furnish the moldboards of the machine with adjustable extensions, so that the rear end of the extension may be lowered or raised, thereby varying the effective length of the moldboard, also the form of the levee may be varied.

Another object of the invention is to provide a levee building machine the blades of which may be maintained substantially parallel with the surface of the ground so as to gather the dirt with which to build the levee from an approximately even depth, when the levee is built after the ground has been prepared and the seed rice drilled in. The rice is drilled into the soil at a considerable depth and it is desired to disturb the rice as little as possible, in order that there will be sufficient seed left in the ground from which the dirt has been scraped off in building the levee, to afford a good stand of rice.

This is accomplished in a preferred embodiment of the invention by a straight bottom regularly shaped moldboard and cutter blade and having an adjustable tail extension which will allow a proper forming of the levee by raising or lowering the rear end of the extension only, thus compelling the moldboard to assume an even depth, horizontal cut, and to gather sufficient dirt to form the levee with a minimum disturbance of the seed bed. It is important to have the implement so constructed as to maintain the moldboards substantially parallel with the surface of the ground and to operate at at even depth so as to avoid disturbing the rice seed bed.

One embodiment of the invention is shown in the accompanying drawings in which:

Fig. 1 is a front perspective view of the levee building machine.

Fig. 2 is a perspective view of the machine taken from the rear.

Fig. 3 is a rear elevational view of the machine.

Fig. 4 is a side elevational view thereof.

Fig. 5 is a top plan view of the machine.

Fig. 6 is a side elevational view of the moldboard and blade assembly showing the swinging hitch for depth adjustment and the wing extension for shaping the top of the levee, with parts of the moldboard broken away and shortened.

Fig. 7 is a perspective view of a front end portion of the moldboard and associated parts.

Fig. 8 is a front end view of the moldboard and associated parts.

Fig. 9 is a section taken along line 9—9 of Fig. 8 looking in the direction as indicated by the arrows.

Fig. 10 is a fragmentary view of the wheel attaching and caster mechanism, as used on each front wheel.

Fig. 11 is a fragmentary view showing a clamp attaching a post to a frame member.

Fig. 12 is an end view of the moldboard on the line 12—12 of Fig. 1.

Fig. 13 is a plan view thereof on the line 13—13 of Fig. 1.

The machine is shown as constructed with a pair of frame bars generally indicated at 1 and 2, these being shown in the form of I-beams, although other shapes may be used as desired. The beams 1 and 2 are held in spaced relation from each other by moldboards 12, and the beams 1 and 2 are held in spaced, parallel alignment from each other by diagonal connecting rods 3, which extend between brackets 4, attached to the respective beams 1 and 2. The connecting rods 3 are adjustable lengthwise, as shown in Figs. 1 and 5, by relatively slidable sections thereof connected together through pins or bolts that permit lengthening or shortening of the sections and the securing of same in adjusted positions.

The beams 1 and 2 are supported respectively on front and rear wheels 5 and 6. Provision is made for varying the height of the beams 1—2, with respect to the ground. Each wheel 5 is mounted on a horizontal shaft 7a secured to a swinging arm 7, which is attached to a lever 8, which lever 8 has a ratchet connection with a segment 9, fixed to the frame 1, whereby the wheel may be raised or lowered relative to the ground. The swinging arm 7 is pivoted in a bracket 10 to swing about a horizontal axis relative thereto, which bracket 10 is also pivoted about a vertical pivot 11, which vertical pivot is arranged within a plane passing through the center of the wheel with respect to the line of travel so as to give a free swinging, caster movement of wheels 5 relative to beam 1. In this way, each of the wheels 5 on beam 1 may be moved either vertically relative to the frame or may swing on the pivot 11 which acts as a caster to provide for freedom of movement in response to the movement of the machine. The bracket 10', mounted on frame 2, permits swinging movement of each of the arms 7b upon movement of lever 8a, which lever has a ratchet connection to hold said arm 7b in adjusted position with respect to frame 2. The swinging movement of the arm 7b about a horizontal axis varies the height of the frame 2 above the ground.

The moldboards are designated generally at 12, two of which are shown as arranged preferably at an acute angle to each other. Each of the moldboards 12 is supported from the frame 1—2 by posts 13. It is preferred that the posts 13 be adjustable with respect to frames 1 and 2, for which purpose they are shown as adjustably connected to frames 1—2 by pins 14. The posts 13 extend upward through the brackets 4 and are secured thereto by pins 14. The rods 3 have eyelets on each end thereof to engage tops of posts 13 so as to hold moldboards 12 in proper angular adjustment and to hold the frame members 1 and 2 in the proper parallel aligned relation. When the machine is traveling over a roadway the wheels 5 and 6 serve to support frame members 1 and 2 which in turn carry posts 13 which support blades 12, therefore, by manipulation of levers 8 and 8a, the blades 12 may be raised and held the desired distance above the ground or roadway.

When it is desired to put the machine in operation, blades 12 are lowered by levers 8 and 8a until the blades engage the ground, at which time the wheels 5 and 6 may be raised above the ground a distance equal to the maximum depth at which it is desired for the blades to engage the ground. By leaving the wheels so positioned the wheels will serve as gauge wheels to prevent the blades from entering the ground deeper than the desired, adjusted depth.

The lower end of each supporting post 13 is pivotally connected at 15 with the adjacent moldboard 12. Provision is made for adjusting the upright angle of the moldboard relative to the supporting posts 13 by means of a bracket 16 fixed to the moldboard and having an arcuate series of openings therein for selective engagement with a bolt 16' which extends therethrough and through the corresponding post 13.

The lower edge of the moldboard 12 is provided with a cutter blade 17, detachably mounted thereon, and extending lengthwise thereof, substantially throughout the length of the moldboard, as shown in Figs. 6 and 8.

As shown in Figs. 2 and 3, the rear end of each moldboard 12, has a wing extension 18 mounted thereon and preferably turned upward and inward at an angle relative to the length of the moldboard 12, as well as being curved lengthwise so as to shape and form the levee. The wing extension 18 is pivotally connected to moldboard 12 by bolt 18' and has bolts and slots 19 disposed on either side of bolt 18' so as to give relative pivotal movement to wing extension 18 so the wing extension may be moved upward or downward so as to form a levee of the desired shape. The wing extensions 18 preferably are connected together by an adjustable connecting bar 20 to prevent spreading thereof while forming the levee.

The moldboard 12 has an upturned flange 21 that is upturned at approximately 45 degrees when viewed from a side and at a right angle to the moldboard, as shown in Fig. 6. This upturned flange has a second lip 21a upturned at approximately a right angle to the face of the flange 21. However, this upturned portion 21a has an angular divergence with respect to the moldboard when viewed from the top, of approximately 34 degrees, and which face 21a is approximately parallel with the line of travel of the machine when operating as a levee builder or for repairing or enlarging levees previously built.

In the building of original levees wherein the soil is being removed evenly from above the seed rice in the seed bed and formed into levees, the upturned flange 21—21a and the skid portion 22 do not serve any function, as they are positioned above the surface of the ground, usually from one-fourth to one-half inch. However, when the levee building machine approaches a cross levee, that is a levee that is built at an angle to the levee being formed, the upturned flanges 21 act as skids to help raise the blades 12 over the levee being crossed. The upturned portions 21 and skids 22 will only permit the blades 12 to dig into the levee crossed the distance which one blade projects below the skid 22; therefore the cross levee is not materially damaged, thereby enabling the operator to join a newly constructed levee with a crosswise levee that he is building, and without requiring shoveling or other manual labor to make the juncture.

When the machine is used to reconstruct or repair a levee that is already built, or when additional dirt is to be added to a levee beyond the capacity of the machine as it makes one pass over the terrain, it is frequently desirable to work the dirt up from each side of the levee, in which case the blade 12 will have the forward end disposed lower than the rear portion thereof, and as the machine is drawn along, the front end of the blade will have a tendency to dig in, which, to a certain extent, is desirable; however, the depth of the digging-in must be gauged, and this is efficiently done by the upturned flange 21. Due to the annular divergence of blade 12 that is engaging the soil on the side of the levee being repaired, the soil is moved upward along the side thereof, with any excess soil being deposited at the rear end of the mold board so as to increase the height of the levee L. The upturned lip 21a is so disposed at an angle as to take the outward thrust, as the face thereof is substantially parallel to the line of travel, when the machine is operated in this manner.

The forward end of each moldboard blade 12 is provided with a swinging hitch 23 pivoted to the moldboard by bolt 23c, and to which a draft device, designated generally at 24, is attached. This enables the machine to be pulled by a tractor or any other suitable means, as found desirable. This swinging hitch 23 is pivoted by bolt 23c, and is adjustable by a pin 23a engaging in holes 23b which are radially arranged with respect to bolt 23c. The adjustment of the depth of the moldboard blades 12 is accomplished by varying the position of the hitch 23 on the moldboard blade 12 by means of a specific adjustment through the pin 23a, hole 23b and bolt 23c with respect to the moldboard 12, thereby changing the line of draft of the chains 24.

The moldboards 12 may be set in any desired angular relation to each other to shape and form the levee as required. Adjustment of the angle of the moldboards symmetrically with respect to the machine, may be indicated by indicia 25, applied to the frame bars 1 and 2, as shown in Fig. 2 or 3. The angularity of the moldboard 12 with respect to the vertical may be adjusted by selectively engaging a bolt 16' in the proper hole of segment 16 and securing post 13 thereto.

The parts of the machine may be adjusted to the desired angle of the moldboards 12 with respect to each other, preferably at an acute angle. A proper adjustment should be made also as to the height of the moldboards with respect to the wheels 5 and 6, as well as the wheels with respect to the frame. The former adjustment may be made by varying the height of the pins in supporting posts 13 while the wheels are adjusted to the proper position by the hand-set levers 8 and 8a.

The forward movement of the machine will scrape together the dirt to form a levee between the moldboards and the wing extensions 18. These wing extensions may be varied with respect to the moldboards, so as to be raised or lowered relative thereto to aid in shaping the levee as formed, as well as to vary the height thereof.

The upturned flanges and runners 21 and 22 on the forward ends of the respective moldboards enable the moldboards to clear any crosswise levee without necessity of adjusting the moldboards. This makes it possible to join the levee to an outside levee or to a cross levee at an angle thereto with a minimum of damage to the levees and with a minimum of labor. It also makes possible the forming of even topped levees and the wing extensions are so positioned as to compress and smooth the soil into a weather resisting levee, and inasmuch as the soil being formed into a levee is often quite wet, this will cause a troweling effect which offers greater resistance to weathering. The various adjustments that are possible with the machine adapt it to any type of soil and make it possible for it to be used under various working conditions.

The brackets 4, which hold the upright posts 13 to the moldboards, are slidable and adjustable lengthwise of the frame bars 1 and 2, and may be secured rigidly in set positions with respect to the latter by means of set screws 4'. These moldboard posts or supports are also rotatable in sockets in the respective bars, so as to provide the desired angle or pitch to the moldboards, as well as adjusting the latter with respect to the frame bars 1 and 2. Upon such adjustment of the brackets 4, the cross braces 3 may be adjusted accordingly, and then secured in set positions to hold the frame 1—2 substantially rectangular.

While the levee builder herein set forth has been described as primarily for removing earth evenly from a seed bed R and parallel with the top of the ground and directing this earth so as to form a levee, the machine is adapted to perform other operations, such as repairing, maintaining or increasing the height of levees previously built. As an example of the adaptability of the device, the machine is described to be used to perform a repairing operation.

To add dirt to one side only of a levee that has already been formed, but is in need of repair or enlargement, the machine is adjusted so that one of the mold boards 12 will be at right angles to frames 1 and 2, which will put it in a parallel position to the line of travel; and the other of the moldboards 12 is adjusted so that the blade will be approximately 34 degrees from the line of travel; and with the first-mentioned blade, that is adjusted parallel to the line of travel, positioned at a point near the top but on the opposite side of the levee from the blade that is adjusted at 34 degrees with respect to the line of travel; and with said last-mentioned blade having the forward end positioned to engage the ground near the bottom of the levee, the soil is engaged and carried upward along the angularly diverging blade so as to distribute the soil along the side of the levee and with the excess soil being disposed at a point near the top of the levee. In so doing, the blade 17 of moldboard 12 will have a tendency to engage the soil to a greater depth than desired and at the same time, due to the outward divergence at the forward end of the blade, the blade will have a tendency to have a side thrust when drawn forward. In order to counteract these two conditions, an upturned flange 21 on the forward end of the moldboard 12 has been provided to act as a skid to prevent the forward end of blade 12 from engaging the ground too deeply. The lip 21a is formed on the upturned flange 21 with the face thereof approximately parallel to the line of travel, so as to take any side thrust which has a tendency to cause the moldboard 12 to move outward. The skid portion 22 is designed to support the blade when it is being operated in this manner, so as to prevent the blade from digging into the soil beyond a predetermined depth.

While the invention has been illustrated and described in one embodiment, it is recognized that variations and changes may be made therein, without departing from the invention, except as specified in the claims.

I claim:

1. In a machine of the character described, the combination of frame bars, moldboards extending transversely of the bars, means mounting the moldboards on the bars, said mounting means including upright supports attached to the moldboards, brackets connected with the supports and forming journals therefor to permit adjustment of the moldboards to different angles relative to the frame bars, and wheeled supporting means connected with the frame bars separate from the moldboard mounting brackets, said brackets being adjustable lengthwise of the frame bars relative to the supporting means to vary the positions of the moldboards relative thereto, and means cooperating with said upright supports to adjust vertically the positions of the moldboard relative to said frame bars.

2. In a machine of the character described, the combination of frame bars, moldboards extending transversely of the bars, means mounting the moldboards on the bars, said mounting means including upright posts pivotally connected with the moldboards and disposed adjacent the frame bars, mounting brackets adjustably connected with the frame bars for movement to different positions relative thereto, and wheeled supporting means connected with the frame bars separate from the moldboard mounting brackets, said mounting posts including means vertically adjusting each of the moldboards independently and bodily relative to the frame bars.

3. In a machine of the character described, the combination of frame bars, moldboards extending transversely of the bars, means mounting the moldboards on the bars, said mounting means including upright posts pivotally connected with the moldboards and disposed adjacent the frame bars, mounting brackets adjustably connected with the frame bars for movement to different positions relative thereto, said mounting posts including means for adjusting vertically, transversely, and independently, each moldboard relative to the frame bars and with respect to each other, supporting wheels for the machine, and means for adjusting the height of the frame bars relative to the wheels.

4. In a machine of the character described, the combination of a frame, moldboards, mounting devices connecting the opposite end portions of each of the moldboards with the frame for vertical adjustment of said moldboard portions relative to the frame, wheeled supporting means connected with the frame independently of the mounting devices, each of the mounting devices including a bracket secured to the frame, a post attached at one end to the moldboard, means adjustably connecting the post and bracket together, means pivotally connecting the moldboards with the posts, and separate means connecting the moldboards with the posts to enable tilting the moldboards relative thereto.

5. In a machine of the character described, the combination of frame bars, moldboards extending transversely of the bars, means mounting the moldboards on the bars, said mounting means including upright supports pivotally attached to the moldboards, brackets connected with the supports and forming journals therefor to permit adjustment of the moldboards to different angles relative to the frame bars, wheeled supporting means connected with the frame bars separate from the moldboard mounting brackets, said brackets being adjustable lengthwise of the frame bars relative to the supporting means to vary the positions of the moldboards relative thereto, and means cooperating with said upright supports to vertically adjust the positions of the moldboards relative to said frame bars.

6. In a machine of the character described, the combination of frame bars, moldboards extending transversely of the bars, means mounting the moldboards on the bars, said mounting means including upright supports pivotally attached to the moldboards, brackets connected with the supports and forming journals therefor to permit adjustment of the moldboards to different angles relative to the frame bars, wheeled supporting means connected with the frame bars separate from the moldboard mounting brackets, said brackets being adjustable lengthwise of the frame bars relative to the supporting means to vary the positions of the moldboards relative thereto, means cooperating with said upright supports to adjust vertically the positions of the moldboards relative to said frame bars, and means forming a runner beside each moldboard, said means having a relatively wide supporting surface and having an upturned forward end portion.

7. A levee building machine comprising front and rear frame bars normally spaced apart and parallel to each other, a bracket mounted on each end of each of said frame bars, means adjustably securing said brackets in selected positions longitudinally of each of said frame bars, a moldboard extending transversely of said frame bars at each side thereof, each of said moldboards having an upright support secured thereto adjacent each end thereof, means pivotally connecting said moldboards to the upright supports for rotation of said moldboards about their respective longitudinal axes, said upright supports of each of said moldboards being rotatably journaled within said brackets on opposite sides of said frame bars, means coacting with each of said brackets and each of said upright supports to vertically and independently adjust each of said moldboards relative to said frame bars, means maintaining said frame bars in substantially parallel relation, a second pair of brackets mounted on each of said frame bars, means securing said last-named brackets on their respective frame bars, said brackets on one of said bars being mounted for adjustment about vertical axes with respect to said securing means, wheels, and means journaled in each of said last-named brackets and connected with said wheels, whereby said wheels of one bar may turn about the vertical axes of said brackets to selected steering positions.

8. In a machine of the character described, the combination of frame bars, moldboards extending transversely of the bars, means mounting the moldboards on the bars, said mounting means including upright supports and forming journals therefor to permit adjustment of the moldboards to different angles relative to the frame bars, expansible and contractible means connected with diametrically opposed upright supports to maintain said frame bars in substanially parallel relation, wheeled supporting means connected with the frame bars separate from the moldboard mounting brackets, said brackets being adjustable lengthwise of the frame bars relative to the supporting means to vary the positions of the moldboards relative thereto, and means cooperating with said upright supports to adjust vertically the positions of the moldboards relative to said frame bars.

CHARLES H. BROWN.

(References on following page)

References Cited in the file of this patent

UNITED STATES PATENTS

| Number | Name | Date |
|---|---|---|
| 158,069 | Hance | Dec. 22, 1874 |
| 278,675 | Bachelder | June 5, 1883 |
| 577,713 | Bickley | Feb. 23, 1897 |
| 579,404 | Michaels et al. | Mar. 23, 1897 |
| 942,749 | Richardson | Dec. 7, 1909 |
| 1,006,146 | Sykes | Oct. 17, 1911 |
| 1,041,387 | Waterman | Oct. 15, 1912 |
| 1,138,735 | Davis | May 11, 1915 |
| 1,146,476 | Clemons | July 13, 1915 |
| 1,247,135 | Monroe et al. | Nov. 20, 1917 |
| 1,413,803 | Smith | Apr. 25, 1922 |
| 1,421,559 | Prendergast | July 4, 1922 |
| 1,672,557 | Chattin | June 5, 1928 |
| 1,830,013 | Bohmker | Nov. 3, 1931 |
| 2,141,693 | Murphy | Dec. 27, 1938 |
| 2,381,330 | Ariens | Aug. 7, 1945 |